United States Patent [19]

Lotspiech

[11] 4,271,476
[45] Jun. 2, 1981

[54] METHOD AND APPARATUS FOR ROTATING THE SCAN FORMAT OF DIGITAL IMAGES

[75] Inventor: Jeffrey B. Lotspiech, Boulder, Colo.

[73] Assignee: International Business Machines Corporation, Armonk, N.Y.

[21] Appl. No.: 58,321

[22] Filed: Jul. 17, 1979

[51] Int. Cl.³ .......................... G06F 15/20; H04N 5/02
[52] U.S. Cl. .................................. 364/515; 340/727; 358/140
[58] Field of Search .................. 364/515; 358/87, 104, 358/140; 340/146.3 D, 146.3 AH, 727

[56] References Cited

U.S. PATENT DOCUMENTS

| | | | |
|---|---|---|---|
| 3,676,850 | 7/1972 | Goldman et al. | 340/727 X |
| 3,959,582 | 5/1976 | Law et al. | 358/87 |
| 3,976,982 | 8/1976 | Eiselen | 340/727 X |
| 4,002,827 | 1/1977 | Nevin et al. | 358/140 X |
| 4,125,862 | 11/1978 | Catano | 358/140 |

*Primary Examiner*—Jerry Smith
*Attorney, Agent, or Firm*—Fraser and Bogucki

[57] ABSTRACT

In a printer system non-coded digital images having a horizontal scan format are rotated into a vertical scan format for printing or other processing thereof. Rotation is accomplished by logically dividing the digital image into a plurality of sections, then rotating the scan direction of each section in sequence, then combining the rotated sections into the completed image. Each image to be rotated and which is in compressed form is temporarily stored in a file from which it is taken for decompression. The decompressed image is transferred for temporary storage in a memory, one section at a time, with the lines of multi-bit words comprising each section being sequentially entered in the memory in the horizontal scan format. Rotation of the section to a vertical scan format is accomplished by addressing the memory in such a manner that the multi-bit words of the section are sequentially transferred out of the memory in columns rather than rows. Sections transferred out of the memory are compressed and stored in the file where the adjacent boundaries thereof are electronically knitted together as may be required by the particular compression technique used.

20 Claims, 10 Drawing Figures

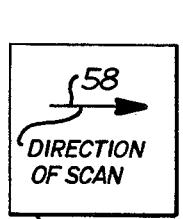
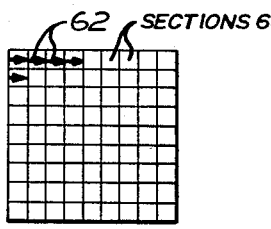
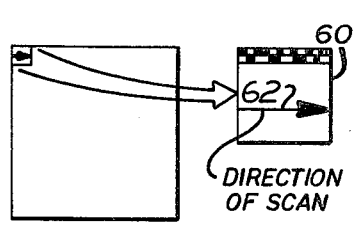
FIG.-2A IMAGE 56
FIG.-2B LOGICALLY DIVIDE IMAGE INTO SECTIONS
FIG.-2C DECOMPRESS EACH SECTION INTO LINES OF DOTS
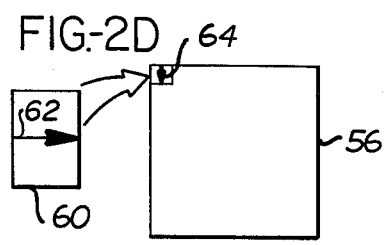
FIG.-2D COMPRESS EACH DECOMPRESSED SECTION WHILE ROTATING DIRECTION OF SCAN 90°
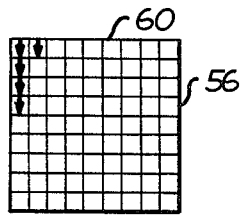
FIG.-2E REPEAT PROCESS OF FIGS. 2C AND 2D FOR EACH SECTION AND KNIT BOUNDARIES TOGETHER AS NECESSARY
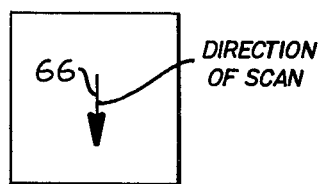
FIG.-2F RESULTING IMAGE 56
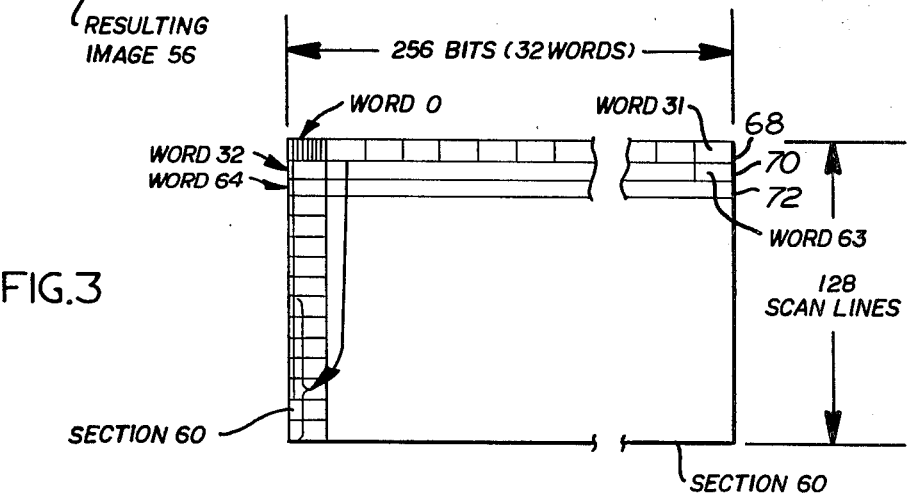
FIG. 3

METHOD AND APPARATUS FOR ROTATING THE SCAN FORMAT OF DIGITAL IMAGES

FIELD OF THE INVENTION

The present invention relates to the printing and other processing of images represented by data, and more particularly to systems of that type in which the images are comprised of non-coded digital information in the form of lines of raster bits arranged in a given scan format or direction.

HISTORY OF THE PRIOR ART

Printer systems in which data to be printed is provided in the form of digital data are well known. Representation of characters or images in digital form provides a convenient way in which to transmit or process the data, especially in presently known data processing environments.

Image data may be in coded (CI) form or non-coded (NCI) form. Characters to be printed are often represented in coded form with each character being represented by a 9-bit byte. Upon printing, each character-representing byte is applied to a character generator which translates the bytes into the appropriate raster bits needed to print the character with the particular print mechanism used. Coded information such as this requires little storage space for an image of given size, and represents a highly compact and efficient means of processing images comprised of characters.

It is not always possible to process images in coded form. This is particularly true of graphical or other non-character images, but it may be true of characters as well. Such non-coded information is comprised of digital data representing the actual raster bits to be used with the printing process. Considering that in a typical arrangement a matrix of dots measuring 24 wide by 40 high may be required to define a single character, it can be appreciated that non-coded information typically requires a substantial amount of storage space. In an effort to reduce the storage and processing requirements for non-coded information, such information is typically handled in compressed form using an appropriate compression algorithm such as run length, reference or error coding. Compression codes such as this often provide for reduction in the volume of data required to represent a given image by as much as 20:1. Difficulties still arise, however, in those instances where a particular process or operation to be performed on non-coded information requires that the information be processed in its decompressed form.

With data processing systems becoming larger and more extensive so as to include different types of printers and other equipment, and particularly with the ever increasing communication of printable information over phone lines and other transmission links between a variety of different equipment, it is sometimes the case that a digital image having a scan format in one direction is desired to be printed using a printer having a different scan format. For example, it may be desired to print an image having a horizontal scan format using a printer having a vertical scan format, or vice versa. If the image is in coded form, it is a relatively simple matter to store the various bytes defining the characters of the image in a relatively small storage area and then rearrange the order of the bytes as they are presented to the character generator for conversion into the modulation bits needed to effect printing. In the case of non-coded information, however, the problem is not nearly as simple. If the image is compressed, it must be decompressed so that the raster bits can be worked on. Moreover, while systems for rotating the scan direction of images are known, such systems are impractical or impossible for use with large non-coded images where substantial amounts of data must be stored and operated on. Examples of state of the art systems for rotating data include U.S. Pat. Nos. 3,803,445, 3,925,765, 3,483,511, 3,792,194, 3,188,386, 3,922,059, 3,959,582, 3,641,260, 3,629,495, 3,902,047 and 3,569,616, and Swiss Pat. No. 573,149. U.S. Pat. No. 3,483,511 of Rabinow concerns a character reader being able to read normal and rotated fonts on documents. The rotated fonts are oriented 90° displaced against the normal fonts. U.S. Pat. No. 3,902,047 of Tyler et al shows rotation of a raster scan of a label reader. Swiss Pat. No. 573,149 of Sondergger describes a computer controlled character printer which allows printing of rotated characters. None of the systems shown and described by the above patents have been able to provide a satisfactory way of rotating non-coded information images in view of the inherent problems discussed above.

Accordingly, it is an object of the invention to provide an improved system for rotating the scan direction of non-coded information.

It is a more specific object of the invention to provide a method and apparatus for rotating the scan direction of digital images using a relatively small amount of data storage and other hardware while at the same time being able to rotate the image as it is being transmitted or received and when the data rate is therefore relatively slow.

BRIEF DESCRIPTION OF THE INVENTION

These and other objects in accordance with the invention are achieved by logically dividing an image to be rotated into sections, then rotating the scan direction of each section in sequence, then combining the rotated sections to form the completed image with a new scan direction while electronically knitting together the adjacent borders of the sections forming the overall image as may be required. By rotating the scan direction of the image, one section at a time, only a relatively small amount of storage space is required to effect rotation of the image which must be done with the image in its decompressed, raster bit form. At the same time, the apparatus for performing rotation forms a part of and interacts with a printer system in such a way that rotation of the image is accomplished during receipt or transmission of the image when the data rate is relatively low and the time required to perform rotation does not become a problem.

In a specific example of a printer system employing apparatus for rotating digital images in accordance with the invention both coded and non-coded information can be stored, printed, transmitted or otherwise processed. Coded images are stored and the various bytes thereof applied to a character generator to effect printing of the individual characters represented thereby. Non-coded images which may be received over a communication line or generated by a document scanner or copier are temporarily stored in a file while the system processor determines whether the scanned direction of the image must be rotated. If it is determined that the image must be rotated, at least a portion of the compressed image is decompressed prior to being divided into sections by windowing logic. The windowing logic separates each section from the remainder of the image by transferring only certain bit positions within certain of the scan lines of the image for temporary storage in a memory. The bits of the section are transferred and stored in the memory in the sequence in which they occur for a given scan direction of the image. When the image has a horizontal scan format the bits of the first horizontal scan line are transferred into the memory in sequence, followed by the bits in the second horizontal scan line, and so on. Rotation of the section temporarily stored in the memory is accomplished by retrieving the bits in a different order for application to compression circuitry to recompress the rotated section. In the case where a horizontal scan format is to be changed to a vertical scan format, the bits comprising the section are removed in vertical columns rather than horizontal rows with the bits of each column being removed in sequence from top to bottom. This is accomplished by an arrangement for addressing the memory that updates the memory addressed using a stored base value for defining each succeeding column and a stored offset value which insures that successive multi-bit words within a given column are addressed. Further circuitry is utilized to select the correct bit from each multi-bit work addressed in this manner.

When at least two sections have been rotated, recompressed and stored back in the file the printer system processor performs any electronic knitting of adjacent section boundaries that may be required by the particular compression algorithm being used. The image as so rotated and assembled in the file may be applied to the printer for printing thereof, transmitted over a communication line coupled to the printer system or otherwise processed as desired.

BRIEF DESCRIPTION OF THE DRAWINGS

The foregoing and other objects, features and advantages of the invention will be apparent from the following more particular description of a preferred embodiment of the invention as illustrated in the accompanying drawings, in which:

FIGS. 2-A through 2-F depict the method of image rotation in accordance with the invention;

FIG. 3 depicts in graphical form a section of a digital image in order to convey an understanding of the manner in which the image is rotated;

DETAILED DESCRIPTION

Figure 1:
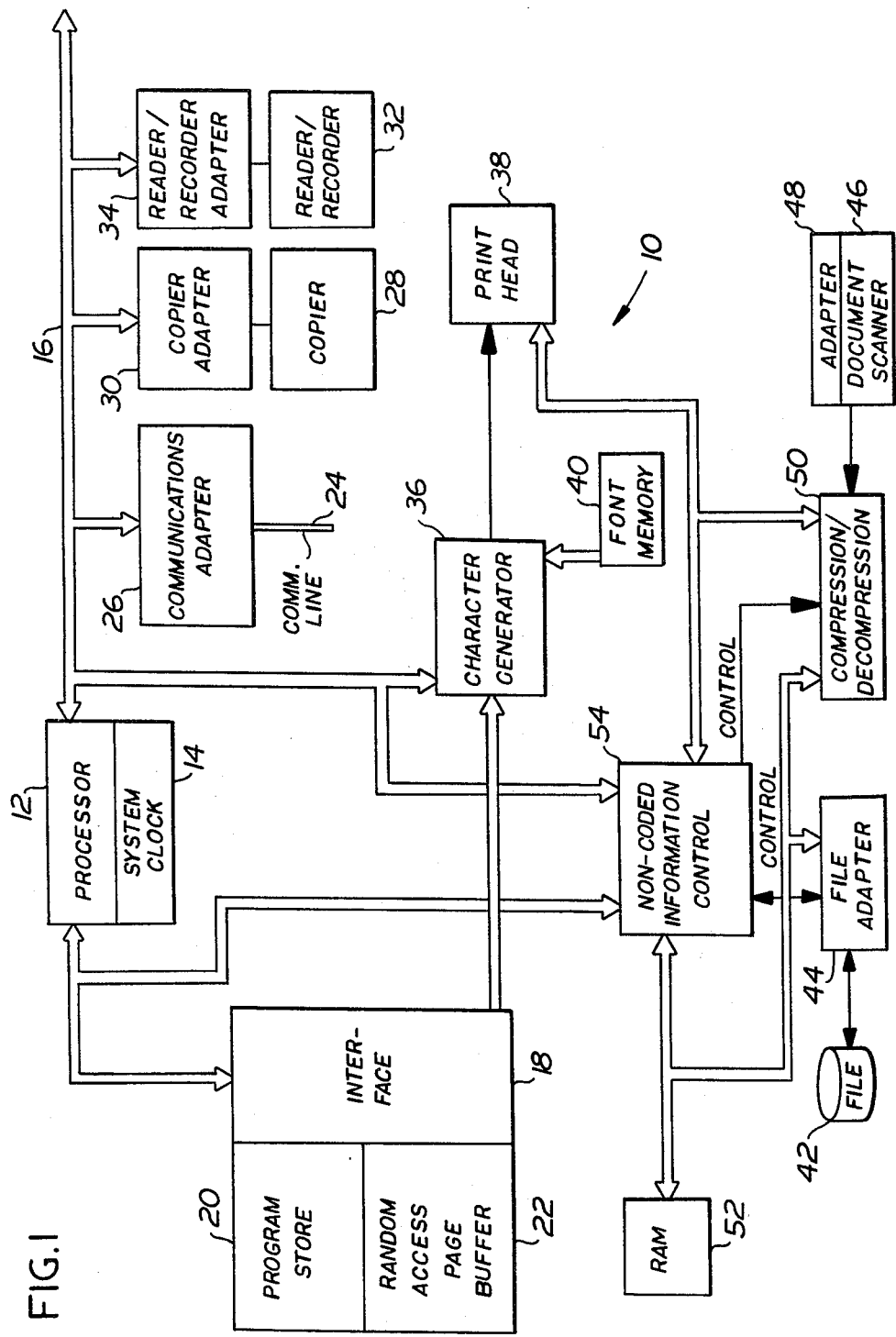
FIG. 1 is a block diagram of a printer system utilizing an image rotation arrangement in accordance with the invention.

FIG. 1 depicts a printer system 10 in accordance with the invention. The printer system 10 is controlled by a processor 12 which includes a system clock 14 and which is coupled between an input/output bus 16 and an interface 18 for a program store 20 and a random access page buffer 22. The input/output bus 16 is coupled to a communication line 24 via a communications adapter 26, to a copier 28 via a copier adapter 30 and to a reader/recorder 32 via a reader/recorder adapter 34 as well as any other appropriate input/output devices that the system 10 may require. The program store 20 stores programs used by the processor 12 in conventional fashion.

Coded information received by the input/output bus 16 may be routed directly to a character generator 36 by the processor 12 but is typically stored in the page buffer 22. In the present example coded information representing characters to be printed is comprised of a series of 9-bit bytes with each byte representing a character to be printed. Seven bits of the 9-bit byte define the character itself, and two of the bits define the character font. As each character-defining byte is applied to the character generator 36 from the page buffer 22 under the control of the processor 12, the character generator 36 translates the byte into the corresponding modulation or raster bits which when applied to a print head 38 effect the desired printing of the character. Aside from the print head 38, the remainder of the printer is eliminated from FIG. 1 for simplicity. A font memory 40 coupled to the character generator 36 provides the appropriate modulation bits for the particular font of the character as defined by the two font-defining bits of the byte applied to the character generator.

To provide the printer system 10 of FIG. 1 with a facsimile capability such that non-coded images can be printed or otherwise processed in addition to coded images, the system is provided with a file 42 coupled via an associated file adapter 44 to the input/output bus 16 as well as to a document scanner 46 having an associated adapter 48. Non-coded images communicated to the printer system 10 via the communication line 24 are applied to the input/output bus 16 from which they are routed to the file 42 for storage. The document scanner 46 which is used to scan documents and generate non-coded images corresponding thereto is another possible source of non-coded images, with such images also being routed to the file 42 for storage in many cases and from there to the communication line 24 for communication to other facsimile systems.

Non-coded images stored in the file 42 may be applied to the print head 38 to effect printing of the image. Since the non-coded image is typically communicated and stored in compressed form, it is necessary to provide a compression/decompression circuit 50. The compression/decompression circuit 50 compresses non-coded images generated by the document scanner 46 prior to storage thereof in the file 42. The circuit 50 also serves to decompress the non-coded image stored in the file 42 so as to provide it in the raster bit form necessary for application to the print head 38 in the event the image stored in the file 42 is to be printed. A random access memory 52 provides storage area that may be necessary during compression and decompression of non-coded images.

In the printer system 10 of FIG. 1, it may become necessary to rotate the scan direction of one or more images to accommodate the different scan directions of different types of apparatus. For example, images generated using a scanner having a different scan direction than that of the print head 38 may be communicated to the printer system 10 via the communication line 24 for printing by the print head 38. It may also become necessary or desirable to rotate an image from within the printer system 10 such as one generated by the document scanner 46 prior to communication of the image over the communication line 24 to another system or component having a different scan direction than the document scanner 46.

In accordance with the invention non-coded images stored in the file 42 are rotated as necessary by an arrangement which logically divides the image into a plurality of different sections with successive sections being rotated and then recombined to form the complete rotated image. A non-coded information control 54 coupled to the processor 12, the random access memory 52, the print head 38, the file 42 via the file adapter 44 and the document scanner 46 via the compression/decompression circuit 50 controls such process. When the processor 12 determines that an image stored or being stored in the file 42 is to be rotated, as soon as a nominal amount of the image is present in the file 42 such amount is transferred to the compression/decompression circuit 50 where it is decompressed in conventional fashion. The non-coded information control 54 logically divides the image into a plurality of sections with each section being temporarily stored in the random access memory 52 in conjunction with rotation thereof. This is accomplished using windowing logic which forms a part of the non-coded information control 54 and which is shown in detail in FIG. 4. The windowing logic transfers the appropriate bits of the appropriate scan lines defining each section of the decompressed image to the random access memory 52. The non-coded information control 54 then rotates the section of the image as it transfers the image back to the compression/decompression circuit 50 using circuitry which is shown in detail in FIG. 5. The circuit shown in FIG. 5 rotates the section as it transfers the section from the memory 52 to the compression/decompression circuit 50 by sequentially addressing the multi-bit words comprising the section in a vertical scan direction rather than a horizontal scan direction. Each section as so rotated is compressed again by the compression/decompression circuit 50 prior to being returned to the file 42 via the random access memory 52 in the event the memory 52 is needed as a buffer.

When at least two rotated sections have been returned to the file 42, the processor 12 performs any electronic knitting of the adjacent section boundaries which may be required by the particular compression code used. Compression algorithms typically used in such systems include run length coding and reference or error coding, with an example being provided by a copending application of G. Goertzel and J. L. Mitchell, Serial No. 951,532, filed Oct. 16, 1978 and commonly assigned with the present application. If the right edge of a first section ends with a run length code and the left edge of an adjacent second section to the right of the first section begins with a run length code, the two run lengths may be added together and encoded as a new run length. In general the code length for the new run length is less than the sum of the lengths of the previous two codes, and compression is thereby enhanced. Furthermore, certain compression code schemes may not allow a run length code of one color to be succeeded by a run length code of the same color, and hence the substitution must be made for correct compression encoding.

In the case of run length coding vertical section boundaries must be knitted together, but not horizontal boundaries. In the case of reference or error code, horizontal as well as vertical boundaries must be knitted together. For example, a reference (or error) event on the bottom scan of the top section may allow a preferred reference (or error) code to be substituted for a run length code for a net savings in compression code length. Furthermore, certain compression code schemes may require a reference (or error) code to be used in all cases where it is possible for one to be used, and hence the substitution must be made for correct compression encoding.

The manner in which images are rotated in accordance with the invention may be better understood with reference to FIGS. 2A–2F which depict the different steps involved in the rotation process. FIG. 2A depicts a typical non-coded image 56 having a horizontal scan format or direction which is assumed to be from left to right as shown by an arrow 58. The image 56 is derived by apparatus which scans from left to right to form a first scan line at the top of the image, then a second scan line, and so on. In the present example it is assumed that the image 56 is to be rotated so as to be compatible with a printer or other equipment which prints along vertical lines from the top to the bottom of the image beginning at the lefthand edge of the image.

To perform rotation of the image 56 of FIG. 2A, the image 56 is first of all logically divided into a plurality of sections 60 as shown in FIG. 2B. The various different sections 60 still have the horizontal direction of scan as shown by arrows 62 therein. The various sections can be formed by dividing the image 56 in any appropriate fashion. The sections themselves can be of any appropriate size as determined by time and storage requirements. Larger numbers of sections require slightly more time to rotate, since each section must be separately and individually transferred and stored in the random access memory 52 as part of the rotation process. However, smaller sections require less storage space, enabling the use of a relatively small memory as the random access memory 52. Because the image 56 is made up of succession of horizontal scan lines having like bit positions therein, a logical approach is to divide the image into square or rectangular sections in checkerboard fashion as seen in FIG. 2B. Thus, each row of the sections 60 can be defined using the same scan line numbers since the sections of that row share the same scan lines. The sections within the row are distinguished by defining a different group of bit positions within the scan lines for each section. Such definitions can be provided by the processor 12 under program control, with the resulting scan line numbers and bit positions being provided to the windowing logic of FIG. 4 described in detail hereafter.

During the next step shown in FIG. 2C each section 60 of the image 56 is decompressed so as to convert the section into the scan lines of raster bits in preparation for rotation. As seen in FIG. 2C the section 60 has been decompressed and separated from the rest of the image 56 and still has the horizontal scan direction 62. In the printer system 10 of FIG. 1 the process steps of FIG. 2C are performed by the non-coded information control 54 in conjunction with the compression/decompression circuit 50 and the random access memory 52. With the processor 12 having logically divided the image 56 into the sections 60 by communicating values defining the scan lines and the bit positions comprising each section to the non-coded information control 54, the compression/decompression circuit 50 decompresses all or at least a substantial portion of the image 56 from the file 42. As the image is decompressed the windowing logic of FIG. 4 within the non-coded information control 54 transfers the raster bits comprising a section to be rotated for temporary storage in the random access memory 52 to the exclusion of other portions of the image 56. The different sections of the image are successively transferred for storage in the random access memory 52 under the control of the windowing logic within the non-coded information control 54. Rotation of each section temporarily stored in the memory 52 is accomplished by the non-coded information control 54 using the circuitry shown in FIG. 5. This is accomplished by retrieving the modulation bits of the section temporarily stored in the random access memory 52 in a different sequence as such bits are transferred to the compression/decompression circuit 50 for compression thereof and then storage of the compressed rotated section in the file 42. This step is shown in FIG. 2D where the section 60 which still has the horizontal scan direction 62 as stored in the memory 52 is retrieved from the memory in such a way as to rotate the horizontal scan direction 62 to a vertical scan direction 64 as the section 60 is compressed by the circuit 50 and stored in its correct position within the image 56 in the file 42.

As shown in FIG. 2E the various different sections 60 are rotated in turn, and then assembled in the file 42. The horizontal and vertical boundaries between the sections 60 are electronically knitted together as necessary to form the completed image 56 which is shown in FIG. 2F and which now has a vertical scan direction as shown by an arrow 66 therein.

FIG. 3 better illustrates the details of the manner in which the process of rotating each section 60 is accomplished. FIG. 3 depicts a typical section 60 which has a horizontal scan format. The section 60 is comprised of a plurality of horizontal scan lines including a first line 68, a second line 70 and a third line 72. Each of the horizontal scan lines is comprised of 256 raster bits which are conveniently divided into 8-bit words. Consequently, there are 32 words in each scan line of the section 60 which comprises a portion of the width of the image 56 which is comprised of 2048 raster bits or 256 words. The first scan line 68 begins with word 0 at the left end thereof and ends with word 31 at the right end thereof. The second scan line 70 begins with word 32 at the left end thereof and ends with word 63 at the right end thereof. The third scan line 72 begins with word 64 at the left end thereof. Rotation is accomplished by retrieving the various raster bits of the stored section 60 in vertical columns of bits beginning at the lefthand edge of the section 60 rather than the horizontal lines of raster bits such as the lines 68, 70 and 72. Thus, the order or retrieval in the example of FIG. 3 is the first bit of word 0, then the first bit of word 32, then the first bit of word 64, and so on until the first column of bits is retrieved. Next, the second bit of word 0 is retrieved, followed by the second bit of word 32, then the second bit of word 64, and so on until the second column of bits is retrieved. This is accomplished by the circuit of FIG. 5 which begins by addressing word 0 in the memory 52, then addresses word 32, word 64 and so on until the first column of words of the section 60 has been addressed. Selection circuitry within the circuit of FIG. 5 selects the first of the eight bits of each word so addressed. The process is then repeated with the second bit of each addressed word being retrieved and sent to the compression/decompression circuit 50. After all of the bits of the first column of words in the section 60 have been retrieved, the circuit of FIG. 5 next addresses word 1, word 33, word 65 and so on with the bit selection circuitry sequencing through each of the eight bits of each word addressed. The process continues until the last column of raster bits at the righthand edge of the section 60 has been transferred.

The savings in storage space provided by rotation of the image in sections can be appreciated when it is considered that a complete image may typically require six million bits of storage space. The random access memory 52, on the other hand, need only be of 32K bit capacity in the present example where each section is 256 bits (32 words) wide by 128 bits (scan lines) high. Images are rotated as they are received or transmitted and not during the actual printing process which requires a much higher data rate. A typical printer, for example, may print at the rate of ten million bits per second. Files providing print data at rates as slow as 0.5 million bits per second can satisfy this requirement if a compression ratio on the order of 20:1 is used. Because the compression ratio may vary from a maximum of 60:1 to as little as 1:1 where certain groups of bits occur, the random access memory 52 provides a useful buffer between the file 42 and the print head 38 in such situations.

Figure 4:
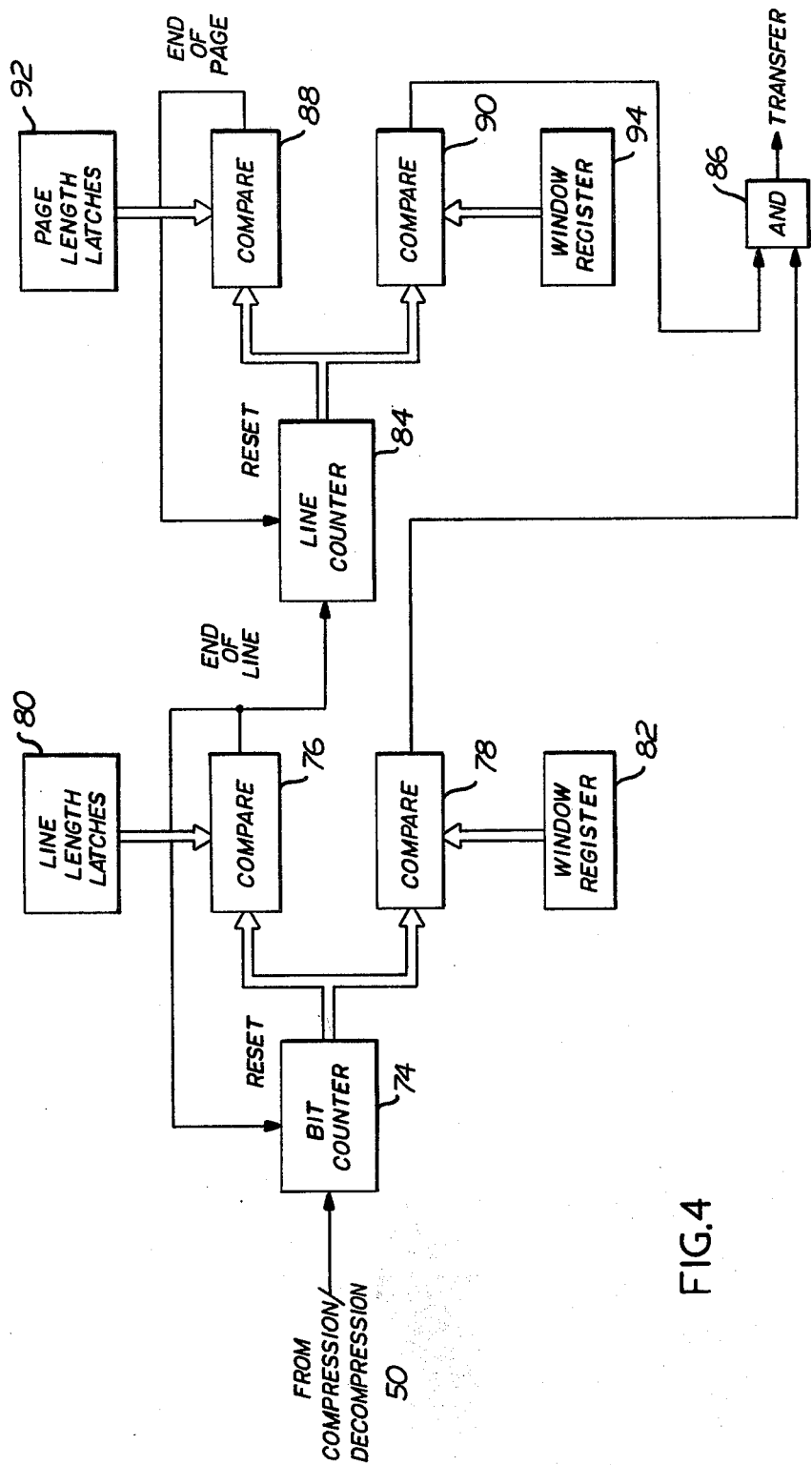
FIG. 4 is a block diagram of a portion of the non-coded information control in the system of FIG. 1.

FIG. 4 depicts the windowing logic within the non-coded information control 54 used to separate each section 60 from the remainder of the image 56 as decompressed by the compression/decompression circuit 50 for transfer to the random access memory 52. The circuit of FIG. 4 includes a bit counter 74 which is advanced by each bit in a given scan line. The output of the bit counter 74 is coupled as one input of each of a pair of compare circuits 76 and 78. A second input of the compare circuits 76 is provided by line length latches 80, and a second input of the compare circuit 78 is provided by a window register 82. The line length latches 80 are preloaded by the processor 12 with a value indicating the number of bits in each scan line of the image. When the bit counter 74 advances to a count equal to the value stored in the line length latches 80, the compare circuit 78 provides an End Of Line signal which provides a pulse to a line counter 84 while at the same time resetting the bit counter 74. The window register 82 is preset by the processor 12 with values representing the beginning and ending bit positions within each scan line encompassed by the particular section 60 being transferred to the random access memory 52. When the bit counter 74 reaches a bit position greater than or equal to the beginning bit position and less than the ending bit position stored in the window register 82, the compare circuit 78 provides an output satisfying one of the inputs of an AND circuit 86. It will be appreciated that this operation can be achieved using relatively simple circuitry when the width of the section 60 is a power of 2. In that case one value is stored in the window register 82, and the compare circuit 78 compares the higher order bits of the window register 82 equal to those of the bit counter 74.

The output of the line counter 84 provides one of the inputs of each of a pair of compare circuits 88 and 90. A second input of the compare circuit 88 is provided by page length latches 92, and a second input of the compare circuit 90 is provided by a window register 94. The line counter 84 is advanced each time the end of one of the scan lines of the image is reached. The page length latches 92 are preloaded by the processor 12 with a value representing the number of scan lines in the page or image. When the line counter 84 reaches a count equal to the value stored in the page length latches 92, the compare circuit 88 provides an End Of Page signal which resets the line counter 84.

The processor 12 loads the window register 94 with values denoting the beginning and ending scan lines of the image contained within the particular section 60 being transferred to the random access memory 52. Whenever the output of the line counter 84 is greater than or equal to the beginning scan line number or less than the ending scan line number stored in the window register 94, the compare circuit 90 provides an output which satisfies a second input to the AND circuit 86. Again, simpler circuitry may be utilized if the length of the section 60 is a power of two. If the first input to the AND circuit 86 is provided by the compare circuit 78 indicating that the particular bit from the compression/decompression circuit 50 is also within the section, then the AND circuit 86 provides a transfer signal providing transfer of the bit to the random access memory 52.

Figure 5:
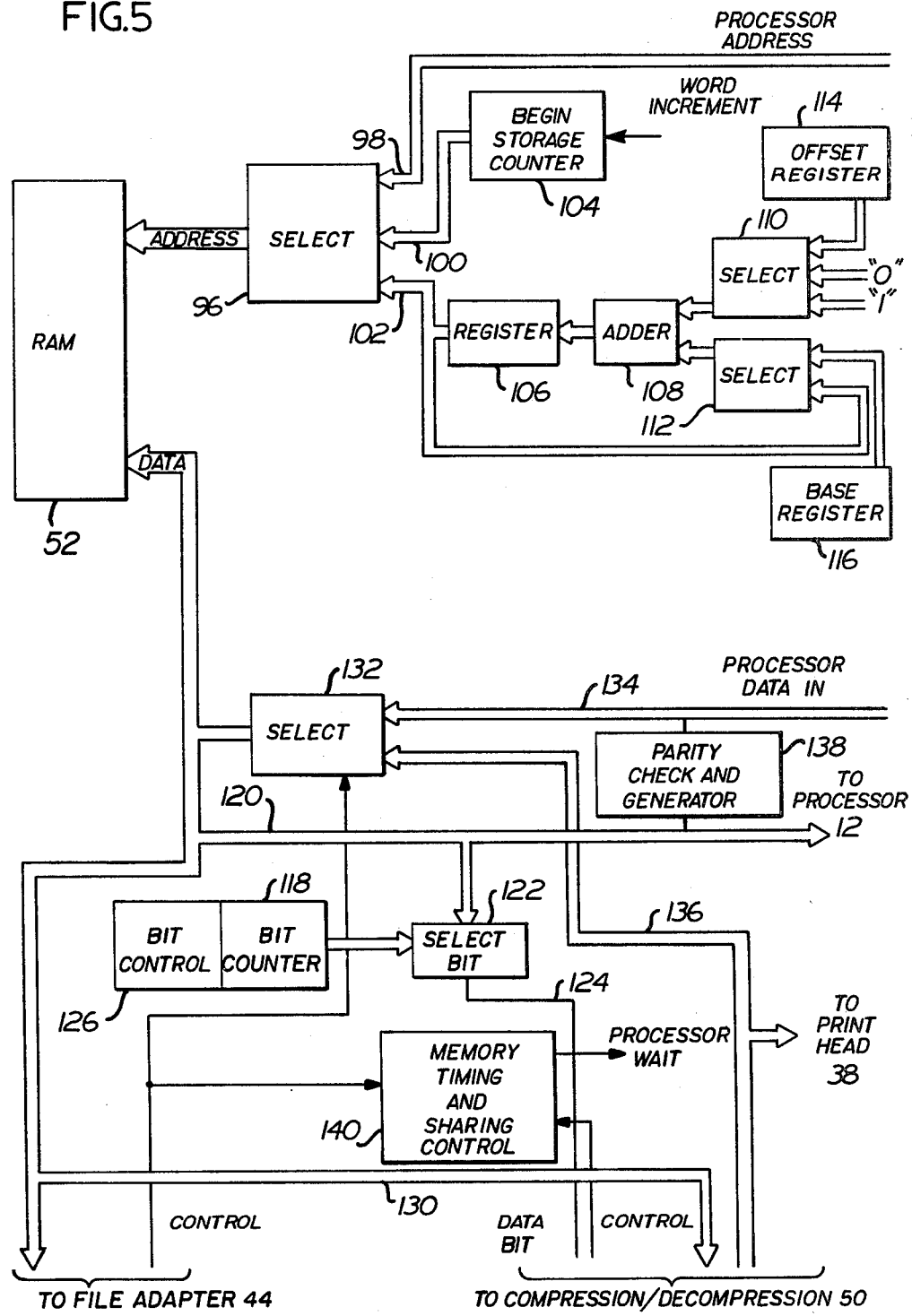
FIG. 5 is a block diagram of another portion of the non-coded information control shown in the system of FIG. 1.

FIG. 5 shows the circuit within the non-coded information control 54 used to address and retrieve each section 60 temporarily stored in the random access memory 52 so as to provide rotation of the section as it is transferred to the compression/decompression circuit 50. Addressing of the random access memory 52 is provided by a select circuit 96 which selects one of three different inputs 98, 100 and 102 thereto. Input 98 is simply a way for the processor 12 to address the random access memory 52 and is not used during rotation of the sections 60. Input 100 is provided by a begin storage counter 104 used to address the random access memory 52 to store the compressed data resulting from the rotation of the section 60. After defining the starting point, the counter 104 is incremented by the occurrence of each word of the compressed section to address each word position as the section is stored in the random access memory 52.

The input 102 to the select circuit 96 which is used during rotation of the section is provided by a register 106 fed by an adder 108 having inputs from a select circuit 110 and another select circuit 112. The select circuit 110 is coupled to receive inputs from an offset register 114, a constant "0" input and a constant "1" input. The constant "1" is not used during rotation of a section 60. The offset register 114 stores a value representing the width of the section 60 in words. In the present example, the image width in words is 32. By passing the value 32 via the select circuit 110 to the adder 108 with each incrementing of the address, the word below the word just addressed will be the next one addressed. Using the offset register 114, columns of words can be addressed. For example, if the address for word 0 shown in FIG. 3 is present in register 106, and assuming the input 102 is coupled through the select circuit 96 to the random access memory 52, word 0 is addressed. This is provided by the "0" input being present at the select circuit 110 so that the circuit 110 provides 0 to the adder 108. At the same time a base register 116 coupled to the select circuit 112 provides a value of 0 via the select circuit 112 to the adder 108. Upon retrieval of word 0 from the memory 52, the value 32 from the offset register 114 is selected via the select circuit 110 and entered in the adder 108. The base register 116 remains at 0. The register 106 is selected by the select circuit 112 so that the adder 108 adds the 0 in register 106 to the value 32 from the offset register 114 and places the result in the register 106 so that the register 106 now addresses word 32. Upon the next bit increment the base register 116 remains at 0 and the offset register 114 again provides the value of 32 to the adder 108. The value 32 is added to the current contents of the register 106, causing the register 106 to address word 64. The process is repeated until all of the words in the first column at the left side of the section 60 have been addressed.

After the column of words of the section 60 has been accessed, the select circuit 110 selects the constant "0" input, the select circuit 112 selects the base register 116 as an input, and together these two values are applied to the adder 108 and placed in the register 106. This results in a zero being placed in the register 106, again starting the process of accessing a column of words in the section 60. Each column of words is accessed eight times, once for each bit in the word.

As each section column is addressed in the random access memory 52, a bit counter 118 counts through the eight different bit positions of the word. The memory 52 is coupled to the compression/decompression circuit 50 through a path which includes an 8-bit wide bus 120, a select bit circuit 122 and a single bit line 124. As the bit counter 118 counts through the eight different bit positions of each word addressed in the memory 52, the select bit circuit 122 selects one of the eight different bits for transfer to the compression/decompression circuit 50. The first time each of the words in a given word column of a section 60 are addressed, the bit counter 118 and the select bit circuit 122 select the first bit from each word in the column for outputting to the compression/decompression circuit 50. During the next sequential addressing of the words in the column, the second bit of each word is selected. The process continues until all eight bits of each word in a given word column have been transferred to the compression/decompression circuit 50. At that point a bit control 126 associated with the bit counter 118 causes the base register 116 to be incremented by one. The bit control 126 also contains a height counter to determine when accessing of a column of words within the section 60 is complete.

As previously noted, when the base register has value 0 stored therein, the register 106 addresses the words in the extreme lefthand column of the image 56. Word 0 is addressed, followed by word 32, then word 64, and so on. When each word in the first column within the stored section 60 has been addressed eight times so that all eight bits therefrom have been transferred to the compression/decompression circuit 50, the bit control 126 increments the base register 116 from value 0 to value 1. This causes the word column immediately to the right of the extreme lefthand column in the image 56 to be addressed. First, the adder 108 adds the value 1 from the base register 116 to the value 0 from the select circuit 110 provided by the "0" input thereto to address word 1. During the next bit increment, the select circuit 110 causes the offset register 114 to apply the value 32 to the adder 108. The adder 108 adds value 32 to value 1 from the base register 116, causing the register 106 to address word 33. On the next bit increment, value 32 from the offset register 114 is added to the previous value of 33 from the adder 108, causing the register 106 to address word 65. The process continues until all of the words in the second column within the section 60 have been sequentially addressed eight different times to permit the eight bits of each word to be transferred to the compression/decompression circuit 50.

Each time a different column of words within the section 60 has been sequentially addressed eight different times, the bit control 126 advances the base register 116 by one so that the next column of words is addressed. When the column of words at the extreme right of the section 60 has been sequentially addressed eight different times, transfer of the section 60 from the random access memory 52 to the compression/decompression circuit 50 is complete. At this time a new section 60 may be brought into the memory 52 from the file 42, the base register 116 may be cleared to zero, and the process may be repeated.

The arrangement of FIG. 5 includes a main data bus 128 coupled to provide data to and receive data from the random access memory 52. The main data bus 128 is coupled to the bus 120 to provide the words of a section 60 to the select bit circuit 122 during rotation. The bus 120 is also coupled to provide data to the processor 12 when required during other operations performed by the printer system 10. The main data bus 128 is also coupled to the file adapter 44. This enables data stored in the random access memory 52 to be transferred directly to the file 42 such as where the sections have been rotated and compressed and are temporarily stored in the random access memory 52. The main data bus 128 is also coupled to the compression/decompression circuit 50 through a bus 130 so that data stored in the memory 52 can be provided directly to the compression/decompression circuit 50. This particular data path may be used such as where an image or a portion thereof from the file adapter 44 is required to be stored in the memory 52 prior to being transferred to the compression/decompression circuit 50 for decompression.

A select circuit 132 provides data input to the random access memory 52 from either a bus 134 coupled to the processor 12 or the compression/decompression circuit 50 via a bus 136. The bus 136 and the select circuit 132 are used to transfer each decompressed section to the memory 52 for temporary storage. The compression/decompression circuit 50 is also coupled directly to the print head 38. When an image or portion thereof stored in the file adapter 44 is to be printed using the print head 38, such image is applied via the bus 130 to the compression/decompression circuit 50 for decompression, following which the decompressed data may be applied directly to the print head 38. A parity check and generator circuit 138 is coupled to the input and output lines between the processor 12 and the random access memory 52. The circuit also includes a memory timing and sharing control 140 which controls time sharing of the random access memory 52 by the processor 12, the compression/decompression circuit 50 and the file adapter 44. The memory timing and sharing control 140 provides various control signals indicating which item can use the random access memory 52.

As the compression/decompression circuit 50 receives bits in vertical order over the bit line 124 from the select bit circuit 122 during rotation, it periodically presents compressed data on the bus 136 for storage in the memory 52. The rate at which compressed data is presented on the bus 136 varies, depending on the amount of compression possible in the particular section 60. The memory timing and sharing control 140 arbitrates between these memory requests from the compression unit 50 and the normal column accesses described above, giving preference to the compression/decompression circuit 50. When the memory timing and sharing control 140 uses a memory cycle to store data from the compression/decompression circuit 50, it causes the select circuit 96 to couple the bus 100 from the begin storage counter 104 to the memory 51. At the same time the bus 136 from the compression/decompression circuit 50 is selected by the select circuit 132 and thereby coupled to the main data bus 128, allowing the compressed data to be stored in the memory 52. After the memory operation, the begin storage counter 104 is incremented by one.

While the invention has been particularly shown and described with reference to a preferred embodiment thereof, it will be understood by those skilled in the art that various changes in form and details may be made therein without departing from the spirit and scope of the invention.

What is claimed is:

1. A machine implementable method of changing the direction of scan of a digital image comprising the steps of:

storing a digital image having a first scan direction;

logically dividing the digital image into a plurality of sections;

removing the sections from the digital image, one at a time;

changing the scan direction of each section upon removal from the digital image, the scan direction being changed from the first scan direction to a different second scan direction; and combining the sections into the digital image having the second scan direction.

2. The invention set forth in claim 1, wherein the second scan direction is 90° removed from the first scan direction.

3. The invention set forth in claim 1, wherein each section is comprised of a sequence of horizontal scan lines with each line being comprised of a sequence of different bit words and the step of changing the scan direction of each of the sections comprises the steps of storing each section and then retrieving the section by sequentially retrieving the first word of each horizontal scan line, then the second word of each horizontal scan line, and so on until all words of the section have been retrieved.

4. The invention set forth in claim 1, wherein the stored digital image is in compressed form, and comprising the further steps of decompressing each section before changing the scan direction thereof and thereafter compressing the section before combining the sections into the digital image.

5. The invention set forth in claim 4, wherein the step of combining the sections into the digital image having the second scan direction includes the step of knitting the combined sections together along the boundaries thereof in accordance with the manner in which the sections are compressed.

6. A machine implementable method of rotating the scan format of a digital image by approximately 90° comprising the steps of:

storing a compressed digital image having a given scan format;

logically dividing the image into a plurality of sections;

removing and decompressing each section of the image, one section at a time;

rotating each section upon removal and decompression, the section being rotated from the given scan format to a different scan format approximately 90° removed from the given scan format;

compressing each rotated section;

assembling the rotated sections into the image having the different scan format; and combining the edges of adjacent sections of the image as required by the form of compression of the image.

7. The invention set forth in claim 6, wherein the given scan format is a horizontal scan format and the different scan format is a vertical scan format.

8. The invention set forth in claim 6, wherein each decompressed section of the image comprises a sequence of scan lines and the step of removing and decompressing each section of the image includes the steps of decompressing at least a portion of the image and storing a predetermined portion of each of a predetermined sequence of the scan lines for subsequent rotation.

9. The invention set forth in claim 8, wherein each of the scan lines is comprised of a sequence of bits and the step of storing a predetermined portion of each of a predetermined sequence of the scan lines comprises storing bits between first and second bit positions in each line occurring between first and second scan line positions.

10. The invention set forth in claim 6, wherein the image is comprised of a sequence of horizontal scan lines with each line being comprised of a sequence of words and each word being comprised of a like number of bits, and the step of rotating each decompressed section comprises the steps of storing the section and thereafter sequentially retrieving the bits of the section as a sequence of bit columns extending from the left end to the right end of the section with the bits of each column being retrieved in sequence from the top to the bottom thereof.

11. A printer system for processing both coded and non-coded information comprising the combination of:
a printer capable of printing in a given scan direction;
means for storing coded information received by the printer system;
a character generator coupled between the means for storing coded information and the printer;
means for storing non-coded information received by the printer system, the means for storing non-coded information being coupled to the printer; and
means responsive to stored non-coded information having a scan direction different from the given scan direction for rotating the non-coded information into the given scan direction, the means for rotating including means for dividing the non-coded information into a plurality of sections, means for removing from the non-coded information and rotating each section into the given scan direction, one section at a time, and means for combining the sections after rotation of the sections into the given scan direction.

12. The invention set forth in claim 11, wherein the non-coded information is received by the printer system in compressed form, and the means for removing further includes means for decompressing the section prior to rotation thereof into the given scan direction and means for compressing each rotated section prior to combining the sections.

13. The invention set forth in claim 11, further including a communications line coupled to the means for storing non-coded information and a document scanner coupled to the means for storing non-coded information.

14. An arrangement for rotating the direction of scan of a digital image comprising the combination of:
first storage means for storing a digital image;
second storage means;
means for logically dividing the digital image into a plurality of sections;
means for sequentially transferring different sections of a digital image stored in the first storage means to the second storage means;
means for rotating the direction of scan of each section of a digital image stored in the second storage means by a predetermined amount; and
means for storing each section the direction of scan of which has been rotated by the predetermined amount in the first storage means, each section of the digital image which is transferred to the second storage means having the direction of scan thereof rotated and being stored in the first storage means before another section of the digital image is transferred to the second storage means.

15. The invention set forth in claim 14, further including means responsive to storage of sections the direction of scan of which has been rotated by the predetermined amount in the first storage means for joining the sections along the boundaries thereof.

16. The invention set forth in claim 14, wherein the means for sequentially transferring different sections of a digital image includes means for decompressing each section prior to transfer to the second storage means and the means for storing each section the direction of scan of which has been rotated includes means for compressing each section the direction of scan of which has been rotated prior to storage in the first storage means.

17. An arrangement for rotating the direction of scan of a digital image comprising the combination of:
a file for storing a digital image;
a decompression circuit coupled to the file and operative to decompress a digital image stored in the file;
a memory;
means for sequentially transferring different sections of a digital image decompressed by the decompression circuit for temporary storage in the memory, each section being transferred by sequentially transferring and storing data comprising the section in the memory in a given sequence;
a compression circuit;
means for transferring the data comprising each section temporarily stored in the memory in a sequence different from the given sequence to the compression circuit, the compression circuit being operative to compress the transferred section;
means for transferring each section compressed by the compression circuit for storage in the file; and
means for combining adjacent portions of sections stored in the file.

18. The invention set forth in claim 17, wherein a digital image as decompressed by the decompression circuit comprises successive lines of bits and the means for sequentially transferring different sections of a digital image decompressed by the decompression circuit includes a bit counter coupled to count bits of the image as decompressed by the decompression circuit, means for resetting the bit counter when the end of each line is reached, means for storing representations of bit positions within each line to be transferred to the memory, bit gating means coupled to the bit counter and responsive to the representations of bit positions within each line to be transferred for transferring the corresponding bit positions of each line of the decompressed image to the memory as they occur at the bit counter when line gating means is open, a line counter for counting the end of a line each time the bit counter is reset, means for storing representations of lines with the image to be transferred to the memory and line gating means coupled to the line counter and responsive to the representations of lines within the image to open and permit transfer of bits to the memory by the bit gating means.

19. The invention set forth in claim 17, wherein each section of the image as temporarily stored in the memory is comprised of columns and rows of multi-bit words and the means for transferring the data comprising each section temporarily stored in the memory in a sequence different from the given sequence to the compression circuit includes means for addressing the memory in the different sequence, the means for addressing including a first register for providing an address to the memory, an adder coupled to the first register, an offset register coupled to the adder and a base register coupled to the adder, the base register being operative to provide to the first register via the adder the base number defining a column of words to be addressed and the offset register being operative to provide to the adder a fixed number so that the first register sequentially addresses the words within the column of words to be addressed.

20. The invention set forth in claim 19, wherein each of the words of the image is comprised of a row of bits and the means for transferring the data comprising each section temporarily stored in the memory in a sequence different from the given sequence to the compression circuit includes means coupled between the memory and the compression circuit for selecting one of the row of bits comprising each word addressed by the means for addressing for transfer to the compression circuit.

* * * * *